United States Patent
Hoefler et al.

(10) Patent No.: US 12,549,041 B2
(45) Date of Patent: Feb. 10, 2026

(54) LAMINATED CORE FOR AN ELECTRIC MACHINE, AND ELECTRIC MACHINE

(71) Applicant: Bayerische Motoren Werke Aktiengesellschaft, Munich (DE)

(72) Inventors: Thomas Hoefler, Groebenzell (DE); Korbinian Koenig-Petermaier, Munich (DE); Joachim Maerz, Holzkirchen (DE); Maximilian Martens, Nuremberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 198 days.

(21) Appl. No.: 18/564,155

(22) PCT Filed: May 10, 2022

(86) PCT No.: PCT/EP2022/062613
§ 371 (c)(1),
(2) Date: Nov. 27, 2023

(87) PCT Pub. No.: WO2022/258281
PCT Pub. Date: Dec. 15, 2022

(65) Prior Publication Data
US 2024/0250564 A1    Jul. 25, 2024

(30) Foreign Application Priority Data
Jun. 10, 2021  (DE) ................ 10 2021 115 033.7

(51) Int. Cl.
*H02K 1/06*   (2006.01)
*H02K 9/22*   (2006.01)

(52) U.S. Cl.
CPC ............... *H02K 1/06* (2013.01); *H02K 9/225* (2021.01); *H02K 9/227* (2021.01)

(58) Field of Classification Search
CPC .......... H02K 1/06; H02K 9/225; H02K 9/227; H02K 9/223; H02K 1/32
See application file for complete search history.

(56) References Cited

U.S. PATENT DOCUMENTS 5,091,666 A * 2/1992 Jarczynski ............. H02K 5/203
310/59
2011/0285339 A1  11/2011 Hyde et al.
(Continued)

FOREIGN PATENT DOCUMENTS

CN    208862646 U    5/2019
DE    2 238 562 A1   2/1974
(Continued)

OTHER PUBLICATIONS

International Search Report (PCT/ISA/210) issued in PCT Application No. PCT/EP2022/062613 dated Sep. 14, 2022 with English translation (5 pages).

(Continued)

*Primary Examiner* — Tulsidas C Patel
*Assistant Examiner* — Mohammed Ahmed Qureshi
(74) *Attorney, Agent, or Firm* — Crowell & Moring LLP

(57) ABSTRACT

A laminated core for an electric machine includes a plurality of core laminations stacked one upon the other in a stacking direction and at least one thermally conductive insert, which is stacked between two core laminations in the stacking direction and has a higher thermal conductivity than the core laminations seated against it.

9 Claims, 1 Drawing Sheet

(56) References Cited

U.S. PATENT DOCUMENTS

| | | |
|---|---|---|
| 2014/0183986 A1 | 7/2014 | Kulkarni et al. |
| 2014/0232221 A1* | 8/2014 | Chang .................... H02K 9/225 |
| | | 310/61 |
| 2015/0042185 A1 | 2/2015 | Buettner et al. |

FOREIGN PATENT DOCUMENTS

| | | |
|---|---|---|
| DE | 295 14 476 U1 | 1/1996 |
| EP | 2 807 732 B1 | 7/2020 |

OTHER PUBLICATIONS

German-language Written Opinion (PCT/ISA/237) issued in PCT Application No. PCT/EP2022/062613 dated Sep. 14, 2022 with English translation (9 pages).

German-language Search Report issued in German Application No. 10 2021 115 033.7 dated Jan. 24, 2022 with partial English translation (11 pages).

\* cited by examiner

LAMINATED CORE FOR AN ELECTRIC MACHINE, AND ELECTRIC MACHINE

BACKGROUND AND SUMMARY

The invention relates to a laminated core for an electric machine, and an electric machine.

Ohmic losses in rotor windings and stator windings, as well as iron losses in lamination stacks subjected to alternating magnetic fields, have to be supplied to a heat sink or cooled in order to avoid the overheating of an insulation of the windings or of magnets in permanently excited machines, for example. A cooling of current-carrying components of the electric machine also improves the efficiency of the electric machine, since at low operating temperatures the electrical resistance is reduced and the ohmic power losses decrease. Thus it is generally already known to cool electric machines, for example by a water jacket in the housing, by open or closed air cooling or, for example, by a liquid-cooled hollow shaft in the rotating rotor.

EP 2 807 732 B1 discloses an electric machine with a stator, a rotor which is rotatably mounted about an axis of rotation, and a shaft to which the rotor is fastened. The rotor comprises a lamination stack which is made of a first material and a cast-on short-circuit ring which is made of a second material, wherein the second material has a specific thermal conductivity which is greater than a specific thermal conductivity of the first material. This cast-on short-circuit ring has a fastening region which is directly attached to the shaft. This short-circuit ring can be used for transferring the waste heat of the rotor to the shaft.

It is the object of the present invention to provide a solution which permits a particularly uniform and effective cooling of the lamination stacks of an electric machine.

This object is achieved according to the claimed invention.

The invention relates to a laminated core for an electric machine, comprising a plurality of core laminations stacked one upon the other in a stacking direction. This electric machine, in particular, is an electric motor for a motor vehicle, the motor vehicle being able to be driven thereby via electrical energy. A wire can be wound around the respective core laminations which are stacked one upon the other in the stacking direction in order to provide a coil and an electromagnet via this coil. Ohmic losses in these coils can result in the development of heat in the coils which can negatively influence an efficiency of the electric machine. As a result, it is provided that the lamination stack is cooled. A single thermal connection between the motor windings or stator windings and a cooled hollow shaft or a housing cooling jacket is a thermal conduction via the lamination stack, which due to its construction provides only a relatively poor thermal conductivity. In particular, the respective core laminations of the lamination stack are provided from steel coated with paint.

In order to achieve a particularly high degree of thermal conductivity in the laminated core, it is provided that the laminated core has a least one thermally conductive insert, which is stacked between two core laminations in the stacking direction and has a higher thermal conductivity than the core laminations seated against it. By way of the at least one thermally conductive insert, therefore, a thermal conductivity of the entire laminated core can be improved, whereby heat can be transported particularly effectively away from the core laminations of the laminated core. This results in a particularly effective cooling of the core laminations of the laminated core, whereby in turn a particularly high degree of efficiency can be achieved of the electric machine having the laminated core. The at least one thermally conductive insert is stacked together with the core laminations in the stacking direction, whereby the thermally conductive insert is seated in each case against a core lamination on the respectively opposing side surfaces. As a result, the thermally conductive insert can transport heat away from the core laminations seated thereagainst, whereby the core laminations of the laminated core can be cooled in a particularly effective manner. A particularly large amount of heat can be dissipated from the laminated core due to the arrangement of the at least one thermally conductive insert between the core laminations of the laminated core.

In a further embodiment of the invention, it is provided that the laminated core has a cooling side in which all of the core laminations of the laminated core can be placed against a heat sink. On this cooling side, the at least one thermally conductive insert terminates flush with the core laminations. The heat sink is designed to transport the heat absorbed from the laminated core away from the laminated core, in order to cool the laminated core. As all of the core laminations of the laminated core on the cooling side can be placed against the heat sink, heat can be discharged to the heat sink from all of the core laminations of the laminated core. Due to the at least one thermally conductive insert which terminates flush with the core laminations stacked one upon the other, the at least one thermally conductive insert can also be placed with the core laminations against the heat sink on the cooling side, whereby heat can be transferred to the heat sink via the at least one thermally conductive insert. As a result, a particularly effective transport of heat is made possible away from the laminated core to the heat sink.

In a further embodiment of the invention, it is provided that the at least one thermally conductive insert comprises aluminum and/or copper. For example, the at least one thermally conductive insert is formed from aluminum or from copper or from an aluminum alloy or from a copper alloy. In particular, when forming the core laminations from coated, in particular painted, steel, the thermally conductive insert, if it comprises aluminum and/or copper, has a higher thermal conductivity than the core laminations, whereby a thermal conductivity of the entire laminated core can be increased by way of the at least one thermally conductive insert. The provision of the at least one thermally conductive insert in the laminated core thus permits a particularly effective cooling of the core laminations.

In a further embodiment of the invention, it is provided that the at least one thermally conductive insert is configured to be hollow, wherein at least one fluid is filled in a cavity of the thermally conductive insert. Heat from the core laminations adjacent to the thermally conductive insert can be absorbed and transported to the cooling side by way of the fluid, whereby the heat can be transferred from the fluid to the heat sink via the cooling side. The provision of the thermally conductive insert with the cavity makes it possible for the fluid to flow within the cavity, whereby heat from the regions of the thermally conductive insert remote from the cooling side can be transferred particularly simply and rapidly via the fluid to the cooling side of the thermally conductive insert by the flow of the fluid. The fluid thus permits a particularly rapid transport of heat from the laminated core to the heat sink via the cooling side.

In this context it can be provided, in particular, that a thermal oil is filled into the cavity as the fluid. The thermal oil, in particular, is particularly temperature-resistant, whereby a risk of a decomposition of the thermal oil when the thermal oil is used in hot regions of the electric machine can be kept particularly low. The thermal oil permits a reliable cooling of the laminated core when used in the electric machine, even when heat develops in the electric machine.

In a further alternative embodiment of the invention, it can be provided that the at least one thermally conductive insert is configured as a two-phase thermosiphon. This means that the at least one thermally conductive insert is configured to be hollow, wherein the fluid which changes its physical state at least once, in particular repeatedly, for cooling the laminated core, is arranged in the cavity of the thermally conductive insert. For example, water can be filled as the fluid into the cavity of the thermally conductive insert. The cavity of the thermally conductive insert is evacuated and only partially filled with the water. When using the at least one thermally conductive insert in the laminated core for a rotor of the electric machine, starting from its liquid state the water can be at least partially evaporated in the cavity when the rotor is rotated, due to the absorption of heat by the thermally conductive insert from the surrounding core laminations. As a result of the centrifugal forces occurring in the cavity when the rotor is rotated, starting from an axis of rotation of the rotor, liquid water can collect radially in an external region of the cavity, whereas the water evaporated to form steam collects on an internal region of the cavity facing the axis of rotation. This internal region of the cavity is arranged, in particular, facing the cooling side of the at least one thermally conductive insert. As a result, the water vapor collected in the internal region of the cavity can be cooled via the cooling side of the laminated core, by heat being removed from the laminated core or the water vapor to the heat sink, and as a result can be condensed. Due to the centrifugal force when the rotor is rotated about the axis of rotation, the condensed water flows from the internal region into the external region of the cavity. This results in a circular flow of water in the cavity, wherein due to the phase change of the water a particularly large amount of heat can be transported away from the core laminations adjacent to the thermally conductive insert and can be transported to the cooling side and, in particular, via the cooling side to the heat sink. Due to the formation of the thermally conductive insert as a two-phase thermosiphon, therefore, a particularly large amount of heat can be dissipated particularly rapidly from the laminated core to the heat sink via the at least one thermally conductive insert.

In a further embodiment of the invention, it is provided that the at least one thermally conductive insert remains with its outer edge behind the core laminations in the region of a pole shoe of the laminated core. In particular, when the laminated core is used in the rotor of the electric machine, therefore, the at least one thermally conductive insert can terminate set back behind an outer edge of the respective core laminations in the region of the pole shoe provided by the laminated core. In other words, the at least one thermally conductive insert starts only at a distance from the air gap, wherein the air gap runs radially outside the pole shoe. As a result, it is possible to avoid the generation of eddy current losses in the thermally conductive inserts.

In a further embodiment of the invention, it is provided that a plurality of thermally conductive inserts are arranged at regular spacings between the stacked core laminations. In other words, the plurality of thermally conductive inserts in each case can have equal spacings from one another in the stacking direction. As a result, a particularly uniform cooling of the laminated core can be achieved via the thermally conductive inserts. For example, every ten core laminations which are stacked one upon the other in the stacking direction can be followed by one thermally conductive insert in the stacking direction, which in turn is followed by ten core laminations which are stacked one upon the other in the stacking direction.

The invention further relates to an electric machine comprising a stator and a rotor which can be rotated relative to the stator about an axis of rotation. The stator and/or the rotor comprise a laminated core as has already been described in connection with the laminated core according to embodiments of the invention. Advantages and advantageous developments of the laminated core are to be regarded as advantages and advantageous developments of the electric machine and vice versa. In particular, the provision of the laminated core in the stator and/or the rotor of the electric machine makes it possible for the electric machine to be able to be operated with a particularly high degree of efficiency and for an overheating of the electric machine to be able to be at least substantially avoided.

In a further embodiment of the invention, it is provided that at least the rotor comprises the laminated core, as has already been described in connection with the laminated core according to embodiments of the invention, and the laminated core is seated with its cooling side against a cooled rotor shaft of the electric machine. In particular, the rotor shaft defines the axis of rotation for the rotor. In order to permit the cooling of the rotor shaft, the rotor shaft can be configured, for example, as a hollow shaft through which a cooling fluid can flow. By placing the laminated core with its cooling side against the rotor shaft, therefore, heat can be discharged from the laminated core to the rotor shaft, whereby the laminated core can be cooled. Inside the rotor shaft in turn, the heat absorbed from the laminated core can be transported away by way of the cooling fluid. Thus a particularly comprehensive cooling of the laminated core can be implemented, whereby in turn the electric machine can be operated particularly efficiently.

Further features of the invention can be found in the claims, the figures and the description of the figures. The features and combinations of features mentioned above in the description and the features and combinations of features shown individually hereinafter in the description of the figures and/or individually in the figures, are not only able to be used in the respectively specified combination but also in other combinations or alone, without departing from the scope of the invention.

DETAILED DESCRIPTION OF THE DRAWINGS

Elements which are the same and functionally the same are provided with the same reference signs in the figures.

Figure 1:
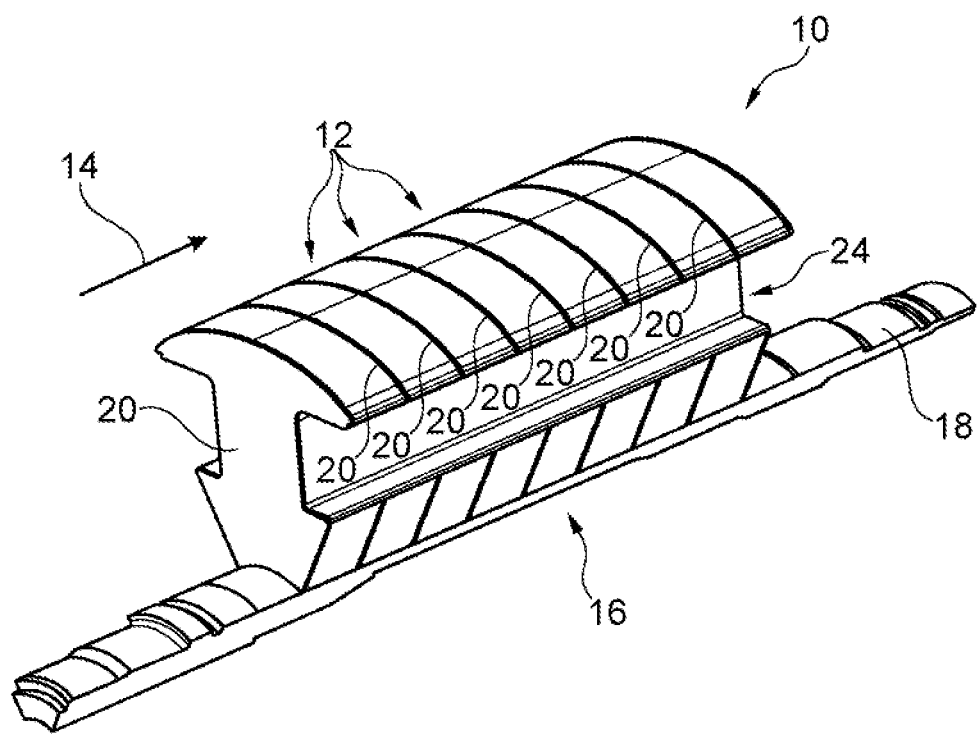
FIG. 1 shows a schematic perspective view of a laminated core which is part of a rotor of an electric machine shown in a detail and which is seated against a rotor shaft of the electric machine, whereby the laminated core can be rotated about a rotor axis provided by the rotor shaft, wherein the laminated core comprises a plurality of core laminations which are stacked one upon the other in a stacking direction and between which a plurality of thermally conductive inserts are stacked.
Figure 2:
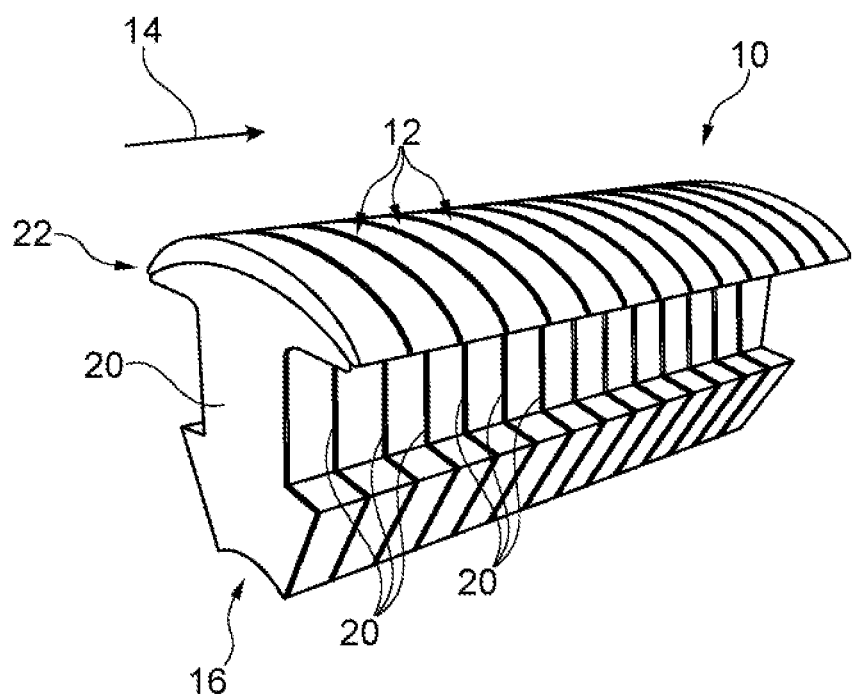
FIG. 2 shows a schematic perspective view of the laminated core in a further embodiment in which a cross-sectional geometry of thermally conductive inserts arranged between respective core laminations deviates from the cross-sectional geometry of the core laminations of the laminated core in the region of a pole shoe.

A laminated core 10 which is part of a rotor of an electric machine is shown in FIG. 1 and in FIG. 2. This electric machine can be designed, in particular, to drive a motor vehicle. In the present illustrations the laminated core 10 forms a 60 degree segment of the rotor. The laminated core 10 comprises a plurality of individual core laminations 12 which are stacked one upon the other in a stacking direction 14. The laminated core 10 has a cooling side 16 on which the core laminations 12 of the laminated core 10 can be placed against a rotor shaft 18 as shown in FIG. 1. The rotor shaft 18 which is shown in FIG. 1 in a detail can be configured, in particular, as a fluid-cooled hollow shaft, whereby the rotor shaft 18 represents a heat sink for the laminated core 10. This means that heat can be transported away from the laminated core 10 via the rotor shaft 18.

In order to permit a particularly high thermal conductivity of the laminated core 10, it is provided that the laminated core 10 comprises at least one thermally conductive insert 20, in the present case a plurality of thermally conductive inserts 20. In the present case, the respective thermally conductive inserts 20 are configured in a planar manner and are adapted with their external contour to an external contour of the core laminations 12. Thus the thermally conductive inserts 20 overlap the core laminations 12 in the stacking direction 14. In the embodiment of the thermally conductive inserts 20 shown in FIG. 1, the core laminations 12 and the thermally conductive inserts 20 entirely overlap one another in the stacking direction 14.

The respective thermally conductive inserts 20 are stacked in the stacking direction 14 between the respective core laminations 12 of the laminated core 10. The respective thermally conductive inserts 20 can be at regular spacings from one another in the stacking direction 14. For example, one thermally conductive insert 20 can be arranged for every five core laminations 12 stacked one upon the other in the stacking direction 14. On the cooling side 16 the thermally conductive inserts 20 terminate flush with the core laminations 12, whereby the thermally conductive inserts 20 together with the core laminations 12 can be placed against the rotor shaft 18. Thus heat can be transferred from the thermally conductive inserts 20 to the rotor shaft 18 via thermal conduction. The thermally conductive inserts 20 are also designed to absorb heat from the core laminations 12 seated thereagainst, in order to discharge this absorbed heat on the cooling side 16 to the heat sink. To this end, it is provided that the thermally conductive inserts 20 have a greater thermal conductivity than the core laminations 12. In the present case, the thermally conductive inserts 20 are formed from copper. Alternatively, the thermally conductive inserts 20 can be formed from aluminum. Alternatively or additionally, the thermally conductive inserts 20 can also be configured with a cavity and thus to be hollow. A fluid can be filled into this cavity. For example, this fluid is a thermal oil or water. If water is filled into the cavity of the respective thermally conductive insert 20, wherein a region of the cavity is evacuated, then these thermally conductive inserts 20 are configured as a so-called two-phase thermosiphon.

In order to keep the generation of eddy current losses particularly low in the core laminations 12, the thermally conductive inserts 20, as can be identified in FIG. 2, can remain behind the core laminations 12 with their respective outer edges in the region of a pole shoe 22 of the rotor. In the region of the pole shoe 22, therefore, the thermally conductive inserts 20 do not terminate flush with the core laminations 12 radially outwardly. In a region of the laminated core facing the rotor shaft 18 the thermally conductive inserts 20 are configured to overlap fully with the core laminations 12 and to have an at least substantially identical external geometry.

As can be identified in FIG. 1, at least one slot insulation 24 can be arranged at the side on the laminated core 10.

The described invention is based on the recognition that by inserting thermally conductive inserts 20 having good thermal conductivity, in particular disks made of copper or aluminum, between the core laminations 12, an average thermal conductivity of the laminated core 10 can be significantly increased and thus an improved transport of heat can be achieved from a winding into the heat sink. This directly increases a continuous output of the electric machine. Alternatively or additionally to providing the thermally conductive disks made of copper or aluminum, the thermally conductive inserts 20 can be configured as hollow disks which are filled with a gaseous medium, a liquid medium or a phase change medium, which according to the principle of a two-phase thermosiphon or a heat pump can permit a particularly high degree of thermal conductivity. With this measure, an active length of the electric machine can be shortened by a thickness of the thermally conductive inserts 20 so that for the same torque a longer stator or rotor has to be built or the currents which are provided have to be increased. The improved cooling provided by the thermally conductive inserts 20 can at least partially compensate for the losses associated therewith. With a length of the active rotor part of a current-excited synchronous electric machine as an electric machine of 136 millimeters, by inserting into the lamination stack aluminum disks with a thickness of 1 millimeter as thermally conductive inserts 20 which have been stamped or lasered on a lamination of the electric machine, an average thermal conductivity of the laminated core 10 of lambda=20 watts per meter and kelvin can increase to approximately 30 watts per meter and kelvin. As a result, a heat output which can be dissipated increases by approximately 50 percent with the same temperature difference over the laminated core 10.

As a whole, embodiments of the invention show how rotor cooling and stator cooling can be achieved by thermally conductive inserts in the lamination stack.

LIST OF REFERENCE SIGNS

10 Laminated core
12 Core laminations
14 Stacking direction
16 Cooling side
18 Rotor shaft
20 Thermally conductive insert
22 Pole shoe
24 Slot insulation

What is claimed is:
1. A laminated core for an electric machine, the laminated core comprising:
 a plurality of core laminations stacked one upon the other in a stacking direction; and
 a thermally conductive insert, which is stacked between two core laminations of the plurality of core laminations in the stacking direction and which has a higher thermal conductivity than the two core laminations of the plurality of core laminations,
 wherein the thermally conductive insert remains with an outer edge behind the core laminations in a region of a pole shoe of the laminated core.

2. The laminated core according to claim 1, wherein:
the laminated core has a cooling side on which all of the core laminations of the laminated core are arrangeable against a heat sink, and
on the cooling side, the thermally conductive insert terminates flush with the core laminations.

3. The laminated core according to claim 1, wherein the thermally conductive insert comprises at least one of aluminum or copper.

4. The laminated core according to claim 1, wherein:
the thermally conductive insert is configured to be hollow, and
a fluid is filled in a cavity of the thermally conductive insert.

5. The laminated core according to claim 4, wherein a thermal oil is filled in the cavity as the fluid.

6. The laminated core according to claim 4, wherein the thermally conductive insert is configured as a two-phase thermosiphon.

7. The laminated core according to claim 1, wherein a plurality of thermally conductive inserts are arranged at regular spacings between the stacked core laminations.

8. An electric machine comprising:
a stator; and
a rotor which is rotatable relative to the stator about an axis of rotation,
wherein at least one of the stator or the rotor comprises the laminated core according to claim 1.

9. An electric machine comprising:
a stator; and
a rotor which is rotatable relative to the stator about an axis of rotation, wherein:
at least the rotor comprises the laminated core according to claim 2, and
the laminated core is seated with the cooling side against a cooled rotor shaft of the electric machine.

* * * * *